(12) United States Patent
Tujkovic

(10) Patent No.: US 7,436,895 B1
(45) Date of Patent: Oct. 14, 2008

(54) CONCATENATED SPACE-TIME CODING

(75) Inventor: Djordje Tujkovic, Oulu (FI)

(73) Assignee: Spyder Navigations L.L.C., Wilmington, DE (US)

( * ) Notice: Subject to any disclaimer, the term of this patent is extended or adjusted under 35 U.S.C. 154(b) by 0 days.

(21) Appl. No.: 10/204,946

(22) PCT Filed: Mar. 1, 2000

(86) PCT No.: PCT/EP00/01713

§ 371 (c)(1),
(2), (4) Date: Oct. 16, 2002

(87) PCT Pub. No.: WO01/65760

PCT Pub. Date: Sep. 7, 2001

(51) Int. Cl.
H04B 7/02 (2006.01)
H04L 1/02 (2006.01)

(52) U.S. Cl. .................. 375/267; 714/752; 714/792
(58) Field of Classification Search ............. 375/267
See application file for complete search history.

(56) References Cited

U.S. PATENT DOCUMENTS

| | | | | |
|---|---|---|---|---|
| 5,996,104 | A * | 11/1999 | Herzberg | 714/755 |
| 6,317,411 | B1 * | 11/2001 | Whinnett et al. | 370/204 |
| 6,584,593 | B1 * | 6/2003 | Seshadri et al. | 714/752 |
| 6,665,357 | B1 * | 12/2003 | Somayazulu | 375/341 |

OTHER PUBLICATIONS

Bauch "Concatenation of Space-Time Block Codes and "Turbo"-TCM" IEEE International Conference on Communications, Jun. 6-10, 1999, pp. 1202-1206, vol. 2, XP002151965.*

Bauch: "Concatenation of space-time block codes and "tubo"-TCM" IEEE International Conference on Communications, Jun. 6-10, 1999, pp. 1202-1206, vol. 2, XP002151965.

Stefanov, Duman: "Turbo coded modulation for wireless communications with antenna diversity" IEEE Vehicular Technology Conference, Sep. 19-22, 1999, pp. 1565-1569 vol. 3, XP002151966.

(Continued)

*Primary Examiner*—Curtis B Odom
(74) *Attorney, Agent, or Firm*—Connolly Bove Lodge & Hutz LLP

(57) ABSTRACT

A method for performing a space-time coding of an information signal to be transmitted by a multi-channel communication system includes demultiplexing received signals into at least two first space-time coded signals and at least two second space-time coded signals, obtaining a first decoding output signal by using a first decoder performing a first space-time decoding based on the at least two first space-time coded signals and a first a-priori probability signal, applying the output of one of a first decoder or a first conversion unit converting the output of the first decoder to a first substracting unit where an a-priori information signal is subtracted, scrambling the output of the first subtracting unit so as to generate a scrambled extrinsic information, applying one of the scrambled extrinsic information or an output of a second conversion unit converting the scrambled extrinsic information as a second a-priori probability to a second decoder receiving that at least two second space-time encoded signals, applying the output of one of the second decoder or a third conversion unit converting the output of the second decoder to a second subtracting unit which has another input receiving the scrambled extrinsic information, generating a descrambled signal based on the output of the second subtraction unit, and applying the descrambled signal or an output of a fourth conversion unit as the first a-priori probability signal to the first decoder.

30 Claims, 7 Drawing Sheets

OTHER PUBLICATIONS

Van Wyk, Linde: "Fading correlation and its effect on the capacity of a space-time turbo coded DS/CDMA systems" IEEE Military Communications Conference, Oct. 13, 1999, Nov. 3, 1999, pp. 538-552, XP002151967.

* cited by examiner

| 00/00, 01/01, 10/02, 11/03 |
| 01/10, 10/11, 11/12, 00/13 |
| 10/20, 11/21, 00/22, 01/23 |
| 11/30, 00/31, 01/32, 10/33 |

| 00/00, 01/01, 10/02, 11/03 |
| 00/10, 01/11, 10/12, 11/13 |
| 01/20, 10/21, 11/22, 00/23 |
| 01/30, 10/31, 11/32, 00/33 |
| 10/22, 11/23, 00/20, 01/21 |
| 10/32, 11/33, 00/30, 01/31 |
| 11/02, 00/03, 01/00, 10/01 |
| 11/12, 00/13, 01/10, 10/11 |

| |
|---|
| 00/00, 01/01, 10/02, 11/03 |
| 00/12, 01/13, 10/10, 11/11 |
| 00/20, 01/21, 10/22, 11/23 |
| 00/32, 01/33, 10/30, 11/31 |
| 01/02, 10/03, 11/00, 00/01 |
| 01/10, 10/11, 11/12, 00/13 |
| 01/22, 10/23, 11/20, 00/21 |
| 01/30, 10/31, 11/32, 00/33 |
| 10/20, 11/21, 00/22, 01/23 |
| 10/32, 11/33, 00/30, 01/31 |
| 10/00, 11/01, 00/02, 01/03 |
| 10/12, 11/13, 00/10, 01/11 |
| 11/22, 00/23, 01/20, 10/21 |
| 11/30, 00/31, 01/32, 10/33 |
| 11/02, 00/03, 01/00, 10/01 |
| 11/10, 00/11, 01/12, 10/13 |

CONCATENATED SPACE-TIME CODING

PRIORITY CLAIM

This is a national stage of PCT application No. PCT/EP00/01713, filed on Mar. 1, 2000. Priority is claimed on that application.

FIELD OF THE INVENTION

The present invention relates to a method and apparatus for performing a space-time coding or decoding in a multi channel communication system such as a multiple antenna wireless communication system, e.g. the GSM (Global System for Mobile communications) system or a WCDMA (Wideband Code Division Multiple Access) system.

BACKGROUND OF THE INVENTION

The demand and growth of wireless communication services has exceeded all its expectations and even more market is expected to be created. So far, speech transmission was the most important part of mobile communications. However, future trends in wireless communications will demand reliable and fast transmission of data and video, Internet browsing and the like. Thus, high data rates of several Megabits per second will be required. At the same time, the trends in design of mobile units are moving towards smaller light weight pocket communicators. Therefore, mobile units need to remain simple in order to enable a practical construction.

Knowledge of the fact that increasing the code word length of block codes or constraint length of convolutional codes leads to better performance dates back to Shannon's theory. It is also well known that maximum-likelihood (ML) decoding leads to the drawback that the performance gain is obtained at the expense of increased complexity up to the point where decoding becomes physically unrealizable. Thus, the research in coding theory over the years has seen many proposals aiming at constructing powerful codes with large equivalent block or constraint lengths structured so as to permit breaking the ML decoding into simpler partial decoding steps.

Turbo codes have been proposed by C. Berrou et al, "Near Shannon limit error-correction coding and decoding: Turbo codes", Proc. IEEE ICC'93, May 1993 as the result of a clever intuition built on several concepts already established. Turbo codes were originally introduced as binary error-correction codes built from a parallel concatenation of two recursive systematic convolutional codes exploiting a suboptimal but very powerful iterative decoding algorithm, the so-called Turbo decoding algorithm. However, it has turned out that the method applied for this parallel concatenation is much more general. The Turbo principle is nowadays successfully applied to many detection/decoding problems such as serial concatenation, equalization, coded modulation, multi-user detection, joint interference suppression and decoding.

Attempts to combine Turbo codes with multi-level amplitude/phase modulations in order to improve transmission spectral efficiency has led to many proposals of so-called Turbo Coded Modulations as suggested by S. LeGoff et al, "Turbo codes and High Spectral Efficiency Modulation", In Proc. IEEE ICC'94, May 1994, New Orleans; P. Robertson et al, "Novel Coded modulation scheme employing Turbo codes", Electronics Letters, Aug. 31, 1995, Vol. 31, No. 18; and S. Benedetto et al, "Concatenated Trellis Coded Modulation", In Proc. IEEE ICC'96. All these schemes are based on G. Ungerboeck's Trellis Coded Modulation (TCM) principle described in "Channel coding with multi-level phase signaling", IEEE Trans. Inf. Theory, Vol. IT-25, January 82, pp. 55-67, which is now a well established technique in digital communications, where significant coding gains are achieved through signal set expansion rather than sacrificing data rate or bandwidth efficiency.

The fundamental phenomenon which makes reliable wireless transmission difficult is time-varying multi path fading with different weights depending on the mobility of users. Strong attenuations make it impossible for the receiver to determine the transmitted signal unless a less-attenuated replica of the transmitted signal is provided to the receiver. This technique is called diversity and presents the well-established and single most important contributor to reliable wireless communications. Diversity assumes sending multiple copies of a signal, which will suffer independent fading. If enough copies are sent, the chances that all of them are subjected to a deep fade will be small. There are a number of ways to implement diversity including time, frequency, polarization, space, and the like.

Time diversity can be achieved by error-control coding and interleaving, where coding adds redundancy to information data and introduces correlation between symbols in the output code word. Interleaving then scrambles the output of an encoder. If the transmission time interval between two consecutive symbols in the code word after interleaving is larger than the coherence time of the channel, symbols will fade independently and thus, combined with decoding, the input information stream can be recovered.

The classical approach to space or antenna diversity is to use multiple antennas at the receiver and perform combining or selection and switching. If the receiving antennas are sufficiently spaced apart, transmitted signals are received over a number of spatially uncorrelated channels and therefore diversity is achieved. The major problem using the receiver diversity in the downlink direction (base-to-mobile) is cost, size and complexity of the mobile units. Electromagnetic interaction of antenna elements of small platforms prevent implementation of more than two uncorrelated antennas at mobile handsets. Therefore, so far, receiver diversity has been almost exclusively applied in the uplink direction (mobile unit to base station) to improve base station reception quality. A solution to improve downlink performance is to exploit sufficiently spaced multiple antennas at the base station so as to achieve a transmit diversity. A number of transmit diversity schemes have been proposed so far which enable the receiver to discard signals transmitted from each component transmitting antenna. Transmitter and receiver antenna diversity can be combined in order to increase diversity order. As can be gathered from G. J. Fochini Jr. et al, "On limits on wireless communication in a fading environment when using multiple antennas", Wireless Personal Communication, March 1998, multiple input multiple output (MIMO) wireless channels, apart from introducing diversity, enable increased information theory capacity compared to single antenna systems. Therefore, antenna diversity will be a key solution for future wireless services having high demands on transmission speed and reliability. The so-called Space-Time Coding schemes are focused on merging antenna diversity with appropriate channel coning in order to exploit benefits of both, coding and antenna diversity gains. One of the first design criteria for such codes were derived by J. C. Gucy et al, "Signal Design for Transmitter Diversity Wireless Communication Systems over Rayleigh Fading Channels", IEEE VTC'96, pp. 136-140. However, the main impetus on research in the field of Space-Time Coding was done by the AT&T Group in V. Tarokh et al, "Space-Time Codes for High Data Rate Wireless Communication: Performance Criterion and Code Construction", IEEE Trans. Inform. Theory, Vol. 44, No. 2, March 1998, where powerful and bandwidth efficient Space-Time Trellis Codes (STTC) were proposed.

Unlike the TCM approach where coding gain is achieved through signal set expansion, the Space-Time Trellis coding approach suggests an expansion in the antenna space. For example TCM enables 2 bit/s/Hz with 8PSK modulation (i.e. PSK modulation with eight complex constellation points) and single transmitting antenna, while in case of STTC 2 bit/s/Hz is achieved with QPSK (Quadrature Phase Shift Keying) modulation (i.e. PSK modulation with four complex constellation points) and two transmitting antennas. The proposed AT&T STTC is a joint design of coding, modulation and antenna diversity. A communication system with n transmitting and m receiving antennas is considered and data is encoded by a channel encoder which adds redundancy to information data and introduces correlation between symbols in the output code word. The output of the encoder is then passed through a serial-to-parallel converter to form n streams of data. Each stream is then modulated and n modulated streams are sent simultaneously over n transmitting antennas so that the redundancy introduced by the encoder does not lead to a decrease of bandwidth efficiency. Additional diversity is achieved due to the fact that the signals are transmitted over a number of n×m uncorrelated fading channels. At the decoder, a maximum likelihood decoding (MLD) is performed to decode signals received by the m receiving antennas.

However, when compared to different transmit diversity schemes which are not designed to exploit any temporal diversity but only spatial diversity, AT&T STTC only leads to very little performance gain. Thus, AT&T STTC was designed to maximize diversity gain for a given number of transmitting antennas but still has very poor coding gain. So far, there has not been established a systematic way to built more powerful STTCs. Moreover, increasing the complexity (number of states) beyond 16 states even leads to a saturation in additional coding gain.

SUMMARY OF THE INVENTION

It is therefore an object of the present invention to provide a method and apparatus for performing a space-time coding or decoding by which the coding efficiency can be enhanced.

This object is achieved by a method for performing a space-time coding of an information signal to be transmitted via a multi-channel communication system, comprising the steps of:

dividing the information signal into at least two parallel signals;

space-time encoding the at least two parallel signals to generate at least two first space-time coded signals;

scrambling said at least two parallel signals to generate at least two second space-time coded signals; and alternately switching the at least two first and second space-time coded signals to at least two respective output channels of the multi-channel communication system.

Furthermore, the above object is achieved by a method for performing a space-time decoding of at least two first and second space-time coded signals alternately transmitted via respective channels of a multi-channel communication system, comprising the steps of:

performing a first space-time decoding based on the at least two first space-time coded signals and a first a-priori probability so as to obtain a first decoding output signal;

performing a second space-time decoding based on the at least two second space-time coded signals and a second a-priori probability so as to obtain a second decoding output signal;

subtracting a descrambled signal from the first decoding output signal to obtain a first extrinsic signal, and subtracting a scrambled signal from the second decoding output signal to obtain a second extrinsic signal, wherein the descrambled signal is generated by descrambling the second extrinsic signal, and wherein the scrambled signal is generated by scrambling the first extrinsic signal; and deriving the first and second a-priori probabilities from the descrambled and scrambled signals, respectively.

Additionally, the above object is achieved by an apparatus for performing a space-time coding of an information signal to be transmitted via a multi-channel communication system, comprising:

dividing means for dividing the information signal into at least two parallel signals;

first coding means for space-time encoding the at least two parallel signals to generate at least two first space-time coded signals;

scrambling means for scrambling the at least two parallel signals;

second coding means for space-time encoding the at least two scrambled parallel signals to generate at least two second space-time signals;

switching means for alternately switching the at least two first and second space-time coded signals to at least two respective output channels of the multi-channel communication system.

Furthermore, the above object is achieved by an apparatus for performing a space-time decoding of at least two first and second space-time coded signals alternately transmitted via respective channels of a multi-channel communication system, comprising:

first decoding means for performing a first space-time decoding based on the at least two first space-time coded signals and a first a-priori probability, and for outputting a first decoding output signal;

second decoding means for performing a second space-time decoding based on the at least two second space-time coded signals and a second a-priori probability, and for outputting a second decoding output signal;

subtracting means for subtracting a descrambled signal from the first decoding output signal to obtain a first extrinsic signal, and for subtracting a scrambled signal from the second decoding output signal to obtain a second extrinsic signal;

scrambling means for generating the scrambled signal by scrambling the first extrinsic signal; and descrambling means for generating the descrambled signal by descrambling the second extrinsic signal;

wherein the first and second a-priori probabilities are derived from the descrambled and scrambled signals, respectively.

Accordingly, two space-time codes are concatenated in parallel. The input information stream is first encoded and then the same input information stream is scrambled and also encoded, wherein the two encoded output signals are alternately switched so that the diversity gain of the output of the overall parallel scheme remains maximum. Thereby, the poor coding gain of a simple (low number of states) component code is multiplied by the introduction of scrambling which acts as a large equivalent number of states in the overall parallel scheme.

The first and second space-time decodings may be symbol-by-symbol space-time decoding operations, wherein the first and second decoding output signals may be obtained by performing a symbol-to-bit reliability conversion of the decoding output, and wherein said first and second a-priori probabilities may be determined by performing a bit-to-symbol reliability conversion based on said descrambled and scrambled signals, respectively. Such a bit-wise scrambling in the decoding operation improves the resolution of an implemented interleaving and increases the block Hamming distance on fading channels. As a result, bit-wise interleaving and resultant iterative (Turbo) decoding on bit level leads to an additional gain in the error event probabilities (FER) even on quasi-static fading channels.

Thus, even for low delay constraint services (e.g. voice transmission) where short frame sizes are required, the proposed decoding scheme according to the present invention offers considerable gains compared to previous solutions. Known Turbo coded systems usually require long frame sizes for good performances.

Preferably, the at least two first and second space-time coded signals are recursive space-time trellis coded (STTC) signals implemented in a Turbo coded modulation. Due to the feedback connection from the output to the input, the impulse response of recursive codes is infinite, which contributes positively to the spectral characteristics of the overall parallel concatenated scheme. When implemented in a parallel concatenation, recursive STTCs provide a superior performance compared to non-recursive STTCs already after six iterations. The performance gain achieved by a parallel concatenated scheme with respect to the performance of a single component code is obtained at the expense of a reduced bandwidth efficiency which is halved. However, in case the switching of the at least two first and second space-time coded signals is performed according to a puncturing scheme, only every second space-time coded symbol (e.g. at least two QPSK signal values) of a respective first space-time encoder is time multiplexed with every second space-time coded symbol of a corresponding second space-time encoder. In this way, full bandwidth efficiency can be preserved. Moreover, a performance advantage can be achieved if 8 or 16 state space-time codes are used.

Preferably, first and second space-time codes may be used for encoding said at least two first and second space-time coded signals, respectively, wherein said first and second space-time codes are recursive STTC codes according to one of the trellis tables and diagrams shown in FIGS. 2A to 2C.

The switching may be performed so that at one time instant, either the at least two first or the at least two second space time coded signals are supplied to the respective output channels. If the switching is performed according to a puncturing scheme, only every second space-time coded symbol of a respective first space-time encoder is time-multiplexed with every other second space-time coded symbol of the corresponding second space-time encoder. Thus, the first space-time coded symbols consist of the at least two first space-time coded signals, and the second space-time coded symbols consist of the at least two second space-time coded signals, wherein one space-time coded signal may represent one point in a complex constellation.

Furthermore, the scrambling may comprise a first scrambling of input bits on odd input signal positions, and a second scrambling input bits on even input symbol positions. Thus, in case of puncturing, interleavers actually consists of two half-length bit-wise interleavers.

Preferably, the at least two first and second space-time coded signals are coded according to a non-systematic coding scheme. Thereby, diversity reduction due to the design of recursive systematic space-time trellis codes can be prevented.

Each one of the at least two first and second space-time coded signals may be selected from a predetermined number of complex constellation points (e.g. four QPSK constellation points). Furthermore, the scrambling may be a pseudo-random bit-wise interleaving. The bit-wise scrambling improves the resolution of the implemented interleaving.

Preferably, the symbol-by-symbol space-time decoding is performed by using a MAP algorithm. The large equivalent number of states makes a maximum likelihood decoding (MLD) practically unrealizable. Therefore, the suboptimal but powerful and more simple iterative MAP (Maximum A posteriori Probability) decoding algorithm is performed to decode the received signals.

The received signal may be demultiplexed into a first sequence and a second sequence, prior to the first and second space-time decoding. In this case, the punctured signals may be replaced by erasures, e.g. the signal values for the erasures may be set to zero.

The at least two first space-time coded signals may be non-recursive STTC signals, and the at least two second space-time coded signals may be recursive STTC signals. Thereby, a good performance can be achieved in case of puncturing on quasi-static fading channels when both component encoders are terminated to an all zero state at the end of each frame. Implementing recursive STTC signals for both component encoders does not allow such a termination of both encoders without a special design of interleaving.

Preferably, the decoding apparatus may comprise demultiplexing means for demultiplexing the alternately transmitted first and second space-time coded signals. The demultiplexing means may be arranged to replace punctured signals of the at least two first and second space-time coded signals by erasures, e.g. the signal values of the erasures may be set to zero.

Preferably, the first and second decoding means are arranged to perform decoding using an iterative decoding algorithm.

The multi-channel communication system may be a multiple antenna wireless communication system. Thereby, a powerful and robust coding/decoding scheme can be provided which can cope with different kinds of fading which are typically time-variant in wireless mobile communication channels depending on the mobility of the users.

Additionally, the above object is achieved by a method for performing a space-time coding of an information signal to be transmitted via a multi-channel communication system, comprising the steps of:

encoding the information signal to generate a coded signal;
scrambling the coded signal;
dividing the scrambled coded signal into at least two parallel signals;
space-time encoding the at least two parallel signals to generate at least two space-time coded signals;
and
alternately switching the at least two space-time coded signals to at least two respective output channels of the multi-channel communication system.

Furthermore, the above object is achieved by a method for performing a space-time decoding of at least two space-time coded signals transmitted via respective channels of a multi-channel communication system, comprising the steps of:

performing a space-time decoding based on the at least two space-time coded signals and a first a-priori probability so as to obtain a first decoding output signal;

performing a second decoding based on a second a-priori probability so as to obtain a second decoding output signal;

subtracting a descrambled signal from the first decoding output signal to obtain a first extrinsic signal, and subtracting a scrambled signal from the second decoding output signal to obtain a second extrinsic signal, wherein the descrambled signal is generated by descrambling the second extrinsic signal, and wherein the scrambled signal is generated by scrambling the first extrinsic signal; and deriving the first and second a-priori probabilities from the descrambled and scrambled signals, respectively.

Additionally, the above object is achieved by an apparatus for performing a space-time coding of an information signal to be transmitted via a multi-channel communication system, comprising:

first coding means for encoding the information signal to generate a coded signal;

scrambling means for scrambling the coded signal;

dividing means for dividing the scrambled coded signal into at least two parallel signals;

second coding means for space-time encoding the at least two parallel signals to generate at least two space-time coded signals and for supplying the at least two space-time coded signals to at least two respective output channels of the multi-channel communication system.

Furthermore, the above object is achieved by an apparatus for performing a space-time decoding of at least two space-time coded signals transmitted via respective channels of a multi-channel communication system, comprising:

first decoding means for performing a space-time decoding based on the at least two space-time coded signals and a first a-priori probability, and for outputting a first decoding output signal;

second decoding means for performing decoding based on a second a-priori probability, and for outputting a second decoding output signal;

subtracting means for subtracting a descrambled signal from the first decoding output signal to obtain a first extrinsic signal, and for subtracting a scrambled signal from the second decoding output signal to obtain a second extrinsic signal;

scrambling means for generating the scrambled signal by scrambling the first extrinsic signal; and descrambling means for generating the descrambled signal by descrambling the second extrinsic signal;

wherein the first and second a-priori probabilities are derived from the descrambled and scrambled signals, respectively.

Accordingly, a serial concatenation scheme is provided. The input information stream is first encoded, then scrambled and divided into two parallel signals which are space-time encoded. Thereby, also in this case, the poor coding gain of a simple (low number of states) component code is multiplied by the introduction of scrambling which acts as a large equivalent number of states in the overall serial scheme.

The first and second space-time decodings may be symbol-by-symbol space-time decoding operations, wherein the first and second decoding output signals may be obtained by performing a symbol-to-bit reliability conversion of the decoding output, and wherein said first and second a-priori probabilities may be determined by performing a bit-to-symbol reliability conversion based on said descrambled and scrambled signals, respectively. Thus, also in the serial concatenation scheme, bit-wise interleaving and iterative (Turbo) decoding on bit level leads to an additional gain in the error event probabilities (FER) even on quasi-static fading channels

BRIEF DESCRIPTION OF THE DRAWINGS

In following, the present invention will be described in greater detail on the basis of preferred embodiments with reference to the accompanying drawings, in which.

DESCRIPTION OF THE PREFERRED EMBODIMENTS

In the following, preferred embodiments of the coding and decoding method and apparatus according to the present invention will be described on the basis of a multiple antenna wireless communication system such as a GSM or future WCDMA communication system.

Figure 1:
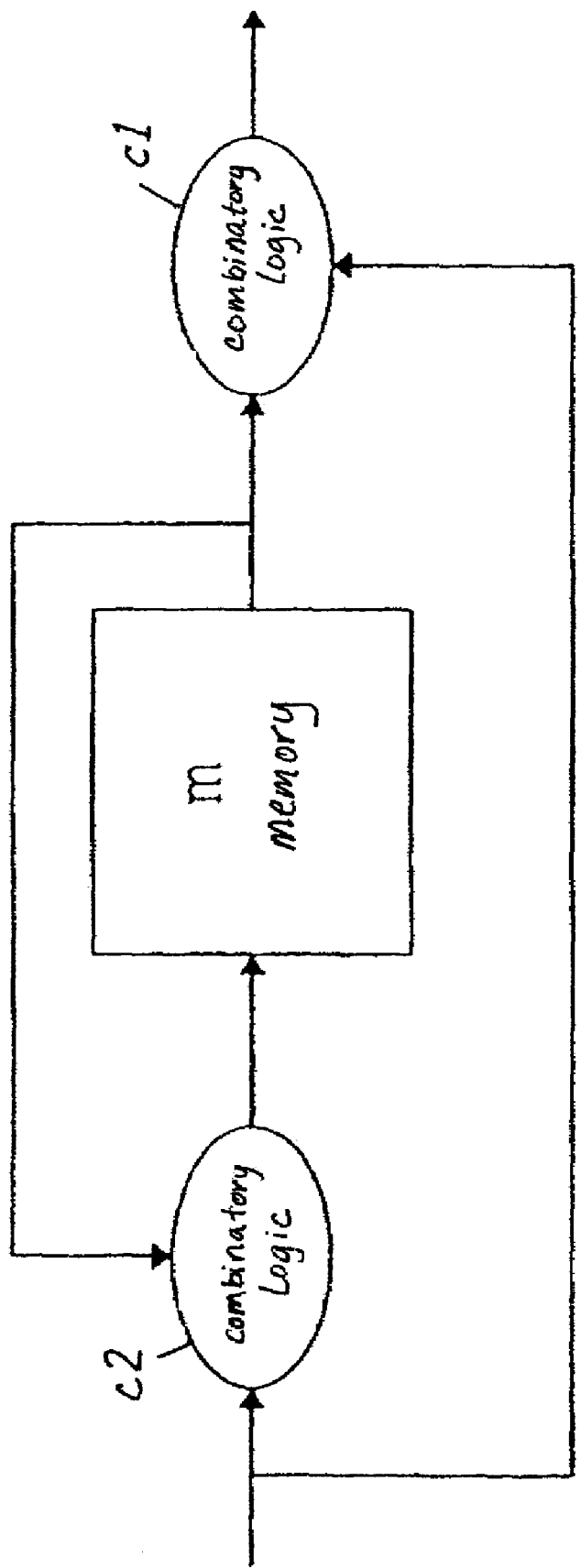
FIG. 1 shows a basic block diagram of a recursive encoder as can be implemented in the preferred embodiments of the present invention.

FIG. 1 shows a general structure of a recursive encoder. Turbo codes require recursive convolutional encoders. An implementation of recursive component codes represents a distinguishing feature of such Turbo codes. Generally, systematic or non-systematic codes can be used. The use of systematic codes simplifies the decoder but has no effects on the attainable performance. According to FIG. 1, the recursive encoder comprises a first combinatory logic c1 by which an input signal or information is combined with an output signal information at the output of the recursive encoder. Furthermore, a second combinatory logic c2 is provided at the input side for combining a signal or information fed back from the output with the input information and supplying the combination result to a memory m which is used to generate the output signal or information.

When implemented alone, non-recursive and equivalent recursive convolutional codes have the same error event probabilities (FER) due to the same free Euclidean distance. The bit error probabilities (BER) depend on the input-output correspondence of the encoders and are thus not the same, although the difference is negligible in practice. Due to the feedback connection from the output to the input of the recursive encoder, the input impulse response is infinite and this contributes well to the spectral characteristics of an overall parallel concatenated scheme.

With careful examination of their trellises, non-recursive AT&T STTCs as defined by V. Tarokh et al in the above mentioned "Space-Time Codes for High Data Rate Wireless Communication: Performance Criterion and Code Construction" can be transformed into Recursive STTC while preserving the maximum diversity gain. However, it has turned out that the design of Recursive Systematic STTCs is not possible without sacrificing some diversity gain. Therefore, the use of non-systematic codes is preferred.

Figure 2A:
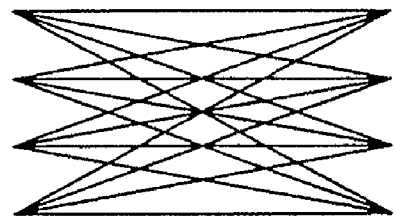
FIGS. 2A to 2C show trellis tables and diagrams of four, eight and sixteen state recursive STTC codes, respectively, according to the preferred embodiments of the present invention.
Figure 2B:
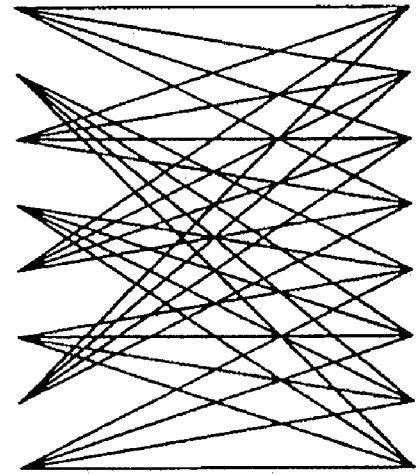
Figure 2C:
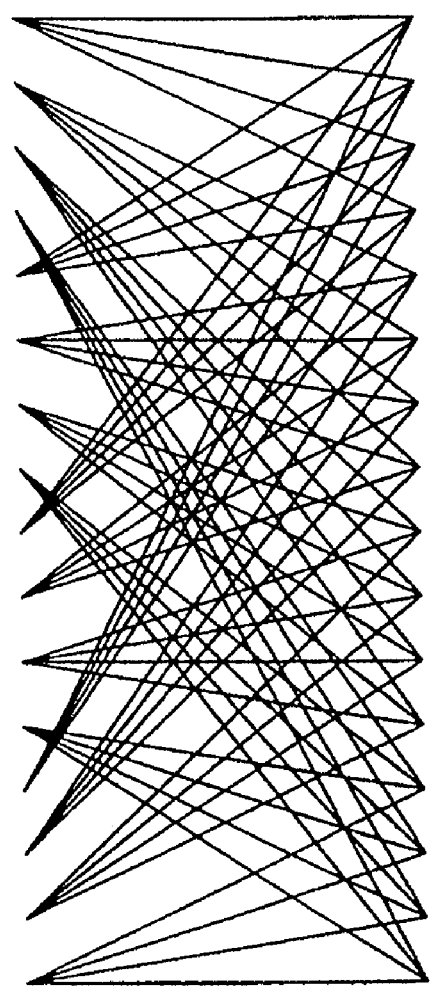

FIGS. 2A to 2C show proposed Recursive STTC codes developed for two transmit antennas and a bandwidth efficiency of 2 bit/s/Hz. It is noted that a generalization for higher number of transmit antennas and bandwidth efficiencies is straightforward. The input-output transitions indicated in a usual manner in the trellis transition tables and diagrams according to FIGS. 2A to 2C are selected to introduce an infinitive impulse response and to generate recursive codes. In the tables, the input-output transitions are given in the form b1b2/S1S2 where, in one time instant and given state, corresponding QSPK code signal values S1 and S2 are generated in case of two input bits b1 and b2. The QPSK code signal values S1 and S2 are then transmitted from two antennas, respectively. The constellation points of the QPSK code signal values S1 and S2 are given in the complex plane in the form "0"=[−1,−i], "1"=[1,−i], "2"=[1,i] and "3"=[−1,i] where i=sqrt(−1).

Thus, the output code signal values depend on the actual input bit combination at the input of the recursive encoder. The memory m stores the transitions indicated in the above trellis diagrams, wherein the actual memory input signal is determined by the result of the logical combination of the combinatory logic c2, and the encoder output signal is obtained by the result of the logical combination of the combinatory logic c1.

Figure 3:
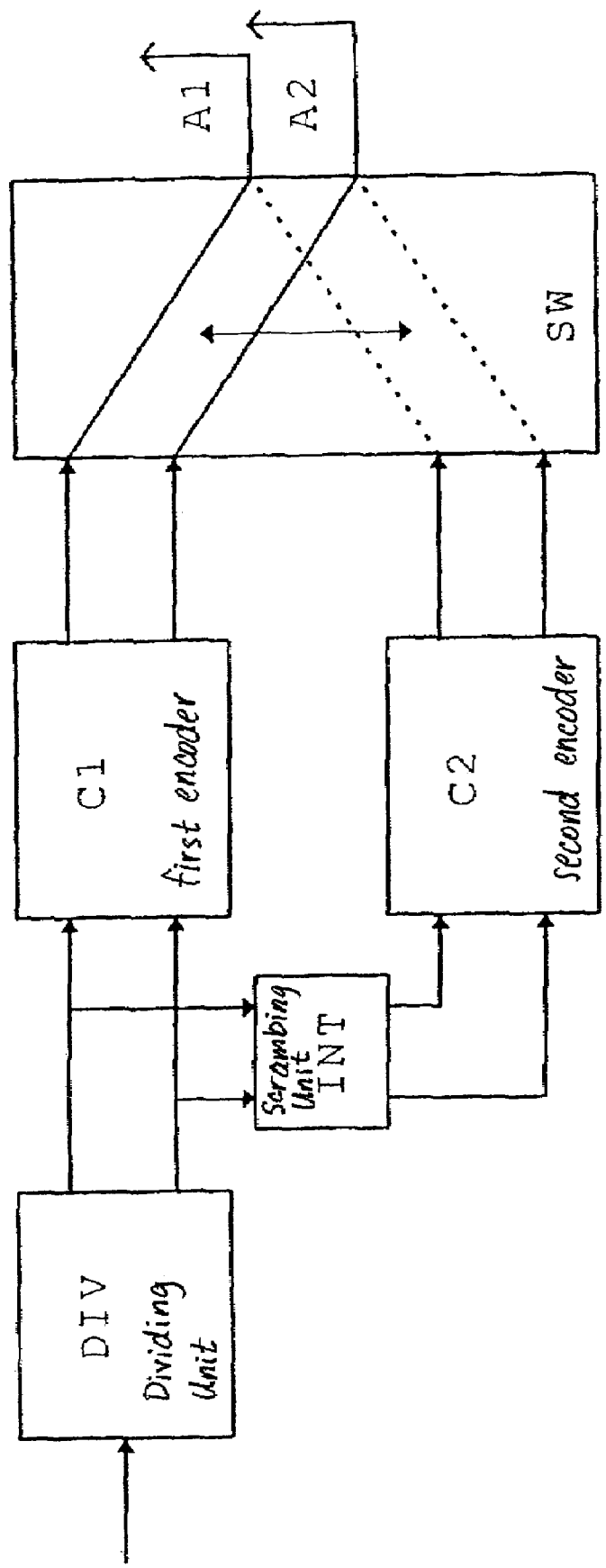
FIG. 3 shows a basic block diagram of a coding apparatus for a parallel concatenation scheme according to a preferred embodiment of the present invention.

FIG. 3 shows a basic block diagram of a coding apparatus according to the preferred embodiment in which a turbo coded modulation scheme is implemented. In particular, two transmit antennas A1 and A2 are provided. The input information stream is first supplied to a dividing unit DIV, e.g. a demultiplexer or switching unit, where it is divided into pairs of bits and encoded by non-binary trellis of a first encoder C1 based on one of the trellis transition diagrams shown in FIGS. 2A to 2C. Thus, the binary input information is coded into corresponding QPSK code signal values.

Additionally, the bit pairs of the input information stream are supplied to a scrambling unit such as a bit-wise interleaver INT, where they are scrambled according to a bit-wise interleaving scheme. The interleaved bit stream is again divided into pairs of bits and encoded by a second encoder C2. The two pairs of coded output QPSK signal values (i.e. one pair from each component encoder C1 and C2), are then supplied to a switching unit SW arranged to switch and/or multiplex the coded QPSK signal values to the two transmitting antennas A1 and A2. Both puncturing and/or multiplexing can be done for the signal value pairs, so that at one time instant only one of the encoders C1 and C2 has access to the two transmitting antennas A1 and A2.

In case of non-puncturing, the equivalent code word length of the parallel-concatenated code is doubled so that the overall bandwidth efficiency is halved to one bit/s/Hz.

In case of puncturing, each of the component encoders C1 and C2 is arranged to transmit only every second of its QPSK pairs, which is then time-multiplexed with every other second of the QPSK pairs of the other encoder. In this way, full bandwidth efficiency of 2 bit/s/Hz can be preserved.

For example, if the output of the first encoder C1 is s1=[S11$^t$S12$^t$, S11$^{t+1}$S12$^{t+1}$, S11$^{t+2}$S12$^{t+2}$, S11$^{t+3}$S12$^{t+3}$] and the output of the second encoder C2 is s2=[S21$^t$S22$^t$, S21$^{t+1}$S22$^{t+1}$, S21$^{t+2}$S22$^{t+2}$, S21$^{t+3}$S22$^{t+3}$], then the output sequence in case of puncturing will be s=[S11$^t$S12$^t$, S21$^{t+1}$S22$^{t+1}$, S11$^{t+2}$S12$^{t+2}$, S21$^{t+3}$S22$^{t+3}$], wherein Sij$^t$ denotes the QPSK code signal value at the time t from the encoder Ci associated to the transmit antenna Aj.

In case of non-puncturing, the pseudo-random bit-wise interleaver INT operates with the same length as the input information frame. In case of puncturing, it may actually consist of two half-length bit-wise interleavers. One interleaver is arranged to scramble input bits on odd input value positions, while the other interleaver which is independent from the one interleaver is arranged to scramble input bit on even input value positions. For example, if the input information frame is (b1, b2, b3, b4, b5, b6, b7, b8, b9, b10, b11, b12), the first interleaver will scramble positions (b1, b2, b5, b6, b9, b10), and the second interleaver will scramble positions (b3, b4, b7, b8, b11, b12). The first and second interleavers may be arranged to operate in a pseudo-random bit-wise manner.

Figure 4:
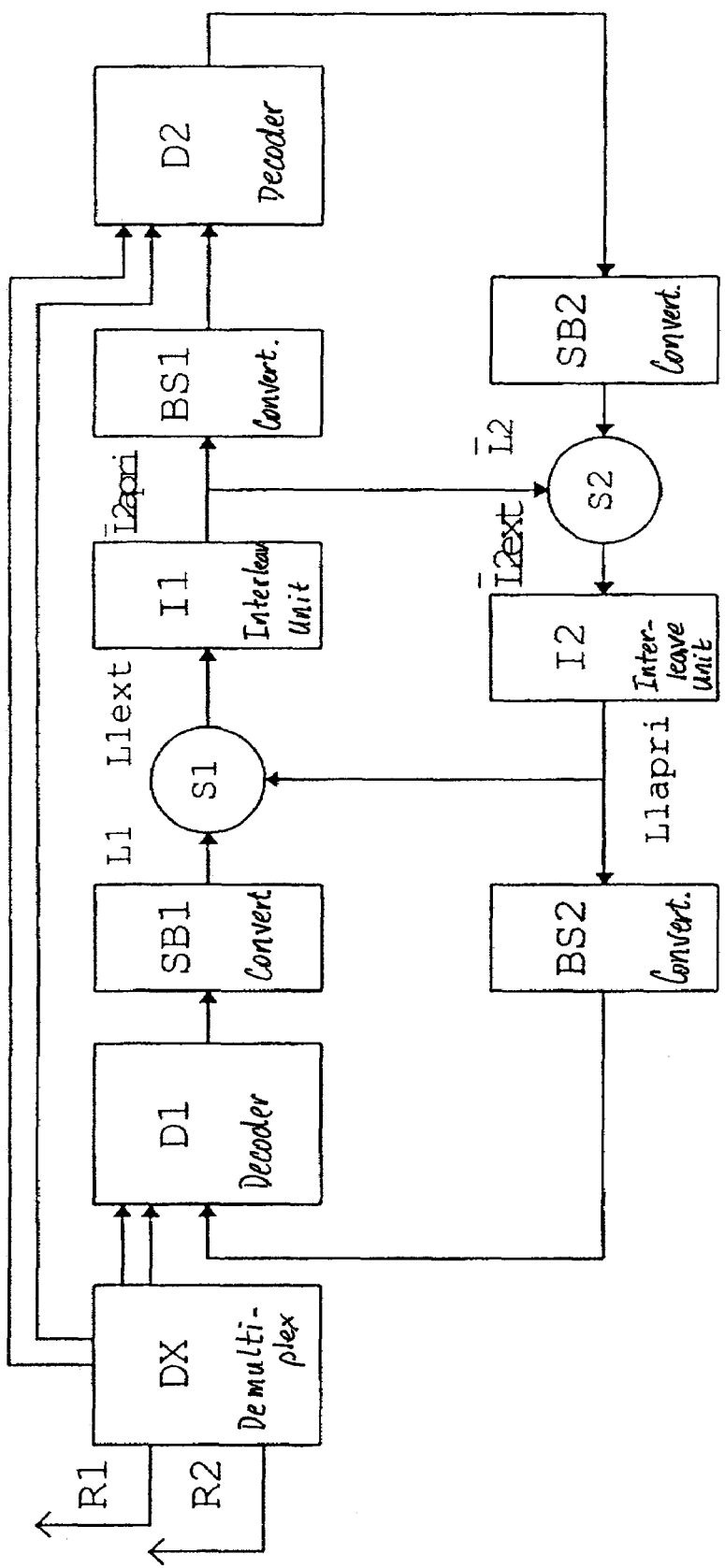
FIG. 4 shows a basic block diagram of a decoding apparatus for a parallel concatenation scheme according to the preferred embodiment of the present invention.

FIG. 4 shows a basic block diagram of a decoding apparatus according to the preferred embodiment of the present invention. In the present case, two receiving antennas R1 and R2 are provided which are connected to a demultiplexer DX. The demultiplexer DX is arranged to alternately switch space-time coded signals received by the receiving antennas R1 and R2 to a first decoder D1 and to a second decoder D2, respectively. Thus, the received signal is demultiplexed into a first and a second sequence supplied to the first and second decoders D1 and D2, respectively.

In case the channels of the communication system are separable at the receiving end, each channel of the space-time coded signals could be demultiplexed. Then, the receiver will be able to distinguish components in the received signals contributed from each of the transmitting antennas A1 and A2. However, in case of wireless communication channels, signals transmitted from the different transmitting antennas A1 and A2 at the same time instant will overlap (interfere each other) at each of the receiving antennas R1 and R2, if no additional processing for channel separation is applied. Actually, received overlap signals are demultiplexed and decoded jointly in this case. In the case of puncturing, an overlapping of two (or more) erasures will again lead to an erasure.

The first and second decoders D1 and D2 are non-binary component decoders which may be arranged to perform decoding by using a symbol-by-symbol MAP algorithm as defined e.g. by L. R. Bahl et al in "Optimal decoding of Linear Codes for minimizing Symbol Error Rate", IEEE Trans. Inform. Theory, Vol. IT-20, pp. 284-287, 1974.

To enable a pseudo-random bit-wise interleaving operation, additional reliability conversion units SB1, SB2, BS1 and BS2 may be provided, in which symbol-to-bit and bit-to-symbol reliability calculations are performed, respectively. The bit-wise scrambling improves the resolution of the implemented interleaving and increases the block Hamming distance on fading channels. As a result of the bit-wise interleaving and resultant iterative (Turbo) decoding operation on bit level, additional 1.5 dB gain in terms of FER can be achieved already on quasi-static fading channels, as compared to a symbol level interleaving.

The decoding output of the first decoder D1 is supplied to a first symbol-to-bit reliability conversion unit SB1 which converts the symbol reliability of the first decoder D1 into a likelihood ratio or reliability L1 of each bit. The bit reliability L1 is supplied to a first subtracting unit S1 which may be an arithmetic unit, where a bit level a-priori information L1$apri$ obtained from the output of the second decoder D2 is subtracted from the bit reliability L1 so as to generate a bit-level extrinsic information L1$ext$ which is supplied to an interleaving unit I1. The interleaving unit I1 performs a pseudo-random bit-wise scrambling or interleaving operation so as to generate a scrambled extrinsic information which is used as a scrambled a-priori information L2$apri$ for the second decoder D2. The bit-level a-priori information L2$apri$ is supplied to a bit-to-symbol reliability conversion unit BS1 which generates an a-priori probability supplied to the second decoder D2.

The output of the second decoder D2 is supplied to a second symbol-to-bit reliability conversion unit SB2 which generates a bit reliability L2 which is then supplied to a second subtracting unit S2. In the second subtracting unit S2, the scrambled bit-level a-priori information L2*apri* is subtracted from the bit reliability information L2 so as to generate a bit-level extrinsic information L2*ext*. The bit-level extrinsic information L2*ext* is supplied to a deinterleaving unit 12 where it is deinterleaved or descrambled so as to generate a descrambled bit-level extrinsic information which is used as the bit-level a-priori information L1*apri* for the first decoder D1, which is also supplied to the first subtracting unit S1. The bit-level a-priori information L1*apri* is supplied to a second bit-to-symbol reliability conversion unit BS2 which generates an a-priori probability for the first decoder D1.

It is assumed that the input information frame of one of the component encoders C1 and C2 according to FIG. 3 consists of N bits denoted as $b=[b_1\ b_2\ b_3\ \ldots\ b_N]$. As the component encoders C1 and C2 are non-binary, the input bit stream b is divided into pairs of bits forming a frame of signal values denoted as $d=[d_1\ d_2\ d_3\ \ldots\ d_{N/2}]$ where a signal value $dk=b_{2K-1}\ b_{2K}$. Then, at the decoding apparatus of the receiving end of the communication system, each one of the receiving antennas R1 and R2 receives a signal which is denoted for the whole input frame as $rj=[rj^1\ rj^2\ rj^3\ \ldots\ rj^L]$, where L=N applies in case of non-puncturing and L=N/2 applies in case of puncturing. At the time t, the received signal by the antenna Rj can be denoted as $$rj^t = \sum_{i=1}^{n} \alpha_{i,j}^t S_{e,i}^t + \eta_j^t, \quad t=1\ldots L, \quad j=1\ldots m \quad (1)$$

where $\alpha_{i,j}^t$ denotes time varying path gains from the transmitting antenna Ai to the receiving antenna Rj moduled as samples of independent zero mean complex Gaussian random variables with variance 0.5 per dimension. The path gains along different paths of the communication channels are assumed to be uncorrelated. $\eta_j^t$ denotes noise samples given as independent samples of zero mean complex Gaussian random variables with variance $\sigma^2$ per complex dimension. $S_{e,i}^t$ denotes QPSK signal values given as outputs of the component encoder e at the time t and transmitted from the antenna i, wherein e=1 for t=2k+1 and e=2 for t=2k, k=0, 1, 2, . . . for both non-punctured and punctured cases.

It is to be noted that the above equation (1) covers the general case of n transmitting antennas and m receiving antennas. Thus, prior to decoding, each received vector rj is demultiplexed into two vectors corresponding to one of the component encoders C1 and C2. In case of non-puncturing, these vectors are $r1j=[rj^1\ rj^3\ rj^5\ \ldots\ rj^{L-1}]$ and $r2j=[rj^2\ rj^4\ rj^6\ \ldots\ rj^L]$, where L=N, while in case of puncturing, punctured signals are exchanged with erasures, i.e. $r1j=[rj^1\ 0\ rj^3\ 0\ rj^5\ \ldots\ rj^{L-1}]$ and $r2j=[0\ rj^2\ 0\ rj^4\ 0\ rj^6\ \ldots\ rj^L]$, where L=N/2.

The output signal of the symbol-by-symbol MAP algorithm performed in the decoders D1 and D2 is given as an a-posteriori probability (APP) of an input signal value $d_k$ conditioned by an observation $r_e=[r_e^1\ r_e^2\ \ldots\ r_e^m]^T$, wherein e=1 or 2. Thus, the APP can be denoted as $$P_r\{d_k = i \mid r_e\} = c \cdot \sum_{M}\sum_{M'} \gamma_i(r_e^k, M', M) \cdot \alpha_{k-1}(M') \cdot \beta_k(M) \quad (2)$$

$\forall i \in \{00,01,10,11\}$ and wherein $r_e^k$ denotes the $k^{th}$ column of the matrix $r_e$. The constant c can be eliminated by a straight-forward normalization. $\alpha_k$ and $\alpha_k$ are results of forward and backward recursions while $\gamma_i$ denotes the branch transition probability for step k and can be denoted as:

$$\gamma_i(r_e^k, M', M) = P_r(d_k = i, r_e^k, S_k = M \mid S_{k-1} = M') =$$

$$P_r\{r_e^k \mid d_k = i, S_k = M, S_{k-1} = M'\} \cdot q(d_k = i \mid S_k = M, S_{k-1} = M') \cdot$$

$$P_r\{S_k = M \mid S_{k-1} = M'\} \quad (3)$$

wherein the first product denotes the APP of the transmitted symbols at time instant k, the second product is either one or zero depending on whether the encoder input i is associated with the transition from state $S_{k-1}=M$ to $S_k=M$, or not. The first product is actually an a-priori probability of the signal value $d_k$ and can be denoted as:

$$P_r\{S_k = M \mid S_{k-1} = M'\} = P_r\{d_k = i\} \quad (4)$$

In the present case of an iterative decoding as shown in FIG. 4, the a-priori probability is supplied by the respective other decoder which makes the iterative (Turbo) decoding algorithm sub-optimal. This is done in all cases except in the first iteration of the first encoder D1 where no a-priori information is available and it is therefore assumed that all input symbols are equally likely. The logarithmic value of the APP in equation (3) can be calculated by using the following equation:

$$\text{Log} P_r\{r_e^k \mid d_k, S_k, S_{k-1}\} = \frac{1}{2\sigma^2}\sum_{j=1}^{m}\left|r_{e,j}^k - \sum_{i=1}^{n}\alpha_{i,j}^k S_{e,i}^k\right|^2 \quad (5)$$

In case of puncturing, for time instants k in which demultiplexed vectors $r_e^k$ are replaced by erasures, equation (5) is equal to 0. This means that in such time instants the channel outputs cannot be used. However, in these moments, the respective other decoder is supplied with its channel outputs and therefore capable of providing a reliable a-priori probability which dominates the term in equation (3). As the component encoders C1 and C2 are of a non-systematic type, the output of the decoders D1 and D2 in equation (2) comprises only two terms (i.e. extrinsic and a-priori information), instead of the usual three terms as in case of systematic component codes. Then, the extrinsic information should be extracted and passed to the respective other decoder. However, as this is done on the bit level, the additional reliability conversion units SB1, SB2, BS1 and BS2 are provided.

The calculation or conversion performed in the symbol-to-bit reliability conversion units SB1 and SB2 can be described by the following equation (6):

$$L(b_k) = \text{Log}\frac{\sum d_k|_{b_k=1} P_r = \{d_k = i | r_e\}}{\sum d_k|_{b_k=0} P_r = \{d_k = i | r_e\}} \quad (6)$$

wherein a log-likelihood ratio is obtained for each information bit $b_k$, k=1 . . . N.

Then, the bit level extrinsic information can be extracted in the respective subtracting units S1 and S2 based on the following equation (7):

$$L_{ext}(b_k) = L(b_k) - L_{apri}(b_k) \quad (7)$$

After bit-wise interleaving or deinterleaving, the bit level extrinsic information is passed through the respective one of the bit-to-symbol reliability conversion units BS1 and BS2 to thereby generate the a-priori probability for the respective other one of the decoders D1 and D2. The bit-to-symbol reliability calculation can be based on the following equation (8):

$$P_r\{d_{k=1}\} = \prod_{j=1}^{0} \frac{\exp(b_{2k-j} \cdot \bar{L}_{ext}(b_{2k-j}))}{1 + \exp(b_{2k-j} \cdot \bar{L}_{ext}(b_{2k-j}))} \quad (8)$$

where $d_k = b_{2k-1} b_{2k} = i$, $i \in \{00, 01, 10, 11\}$.

It is to be noted, that in the first decoding iteration of the first decoder D1, L1$apri$ in FIG. 4 is set to zero, the decoding operation.

Furthermore, it is noted that the decoding operation may be performed without the above symbol-to-bit and bit-to-symbol reliability conversion. In this case, the reliability conversion units SB1, SB2, BS1 and BS2 are not required and the interleaving and deinterleaving units I1 and I2 are arranged to operate on a symbol level, i.e. whole symbols are interleaved or scrambled. Then, the scrambled and descrambled extrinsic information directly corresponds to the respective a-priori probability, and the decoder outputs are directly supplied to the respective one of the subtracting units S1 and S2.

The proposed Space-Time Turbo Coded Modulation (STTCM) has been tested under three realizations of frequency non-selective Rayleigh fading channels, quasistatic block and fast (fully interleaved) fading channels. In all simulations, the input information frame was restricted to 130 bits which in case of Turbo codes falls into the region of extremely short frame sizes.

In case of parallel concatenation, recursive codes differ more than 2.5 dB in gain over AT&T codes in terms of FER. The outputs of the encoders C1 and C2 were directly assigned to the transmit antennas A1 and A2. In case of punctured versions of the proposed STTCM, full bandwidth efficiency of 2 bit/s/Hz is preserved. The number of decoding iterations may be set to 10.

In case of puncturing on quasistatic fading channels where short transmission frame sizes are implemented, it has turned out that the best performance can be achieved by combining a non-recursive AT&T STTC with a recursive STTC, when both component encoders C1 and C2 are terminated to an all zero state at the end of each frame, though not with the same tail sequence. Implementing recursive STTC for both component encoders C1 and C2 does not allow terminating both encoders without a special design of interleaving. It can be shown that in case of puncturing for extremely low frame sizes, the effect of leaving the second encoder C2 unterminated is considerable.

Simulation results on block fading channels as provided in wireless communication systems employing multicarrier modulation or in GSM frequency hopped systems indicate that after 10 decoding iterations, the performance gain achieved by the present invention is about 3 dB on FER=$10^{-2}$, in case two parallel concatenated 8 state recursive STTC are compared to 8 and 16 state AT&T STTC. Eight state codes are basic codes for introducing the punctured scheme, as it has been realized that four state component codes are too weak for punctured versions. Thus, in case 8 or 16 state codes as shown in FIGS. 2B and 2C are used in combination with the punctured scheme, a high bandwidth efficiency can be preserved, since only every other code signal value is alternately transmitted. In terms of bit error probability (BER), the performance gain is more than 5 and 7.5 dB as compared to the 16 state and 8 state AT&T STTC, respectively, on fast fading channels.

The coding and decoding schemes according to the present invention can be implemented in adaptive systems using same encoders and decoders, wherein the puncturing and non-puncturing may be controlled with e.g. only one bit of feedback information to thereby adapt the transmission rate and performance to fading variations. Moreover, the proposed coding/decoding scheme can be used for downlink (base-to-mobile) and uplink (mobile-to-base) communications, as future trends are predicting two antennas in mobile handsets. The scheme can be readily implemented for delay constraint services (voice transmission) as it provides a superior performance already in case of extremely short frame sizes (e.g. 130 bits). In case of delay non-constraint services (data transmission) larger frame sizes are usually used, such that the performance of the scheme is further improved.

Figure 5:
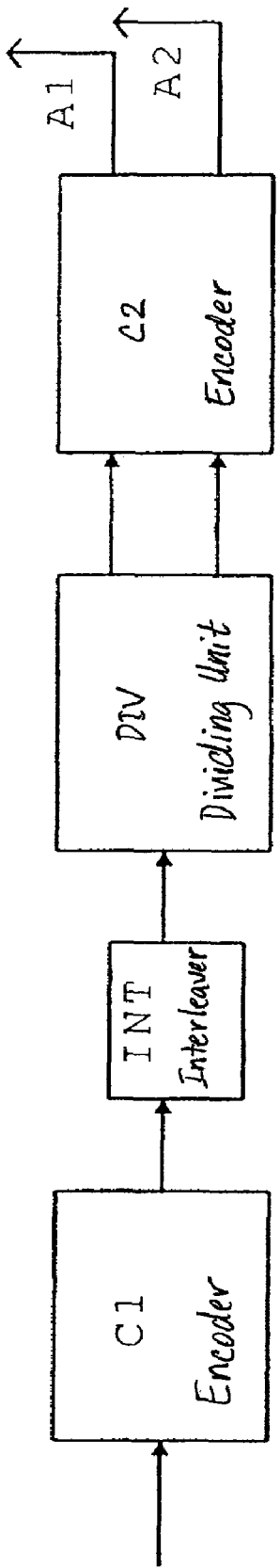
FIG. 5 shows a basic block diagram of a coding apparatus for a serial concatenation scheme according to an alternative preferred embodiment of the present invention.
Figure 6:
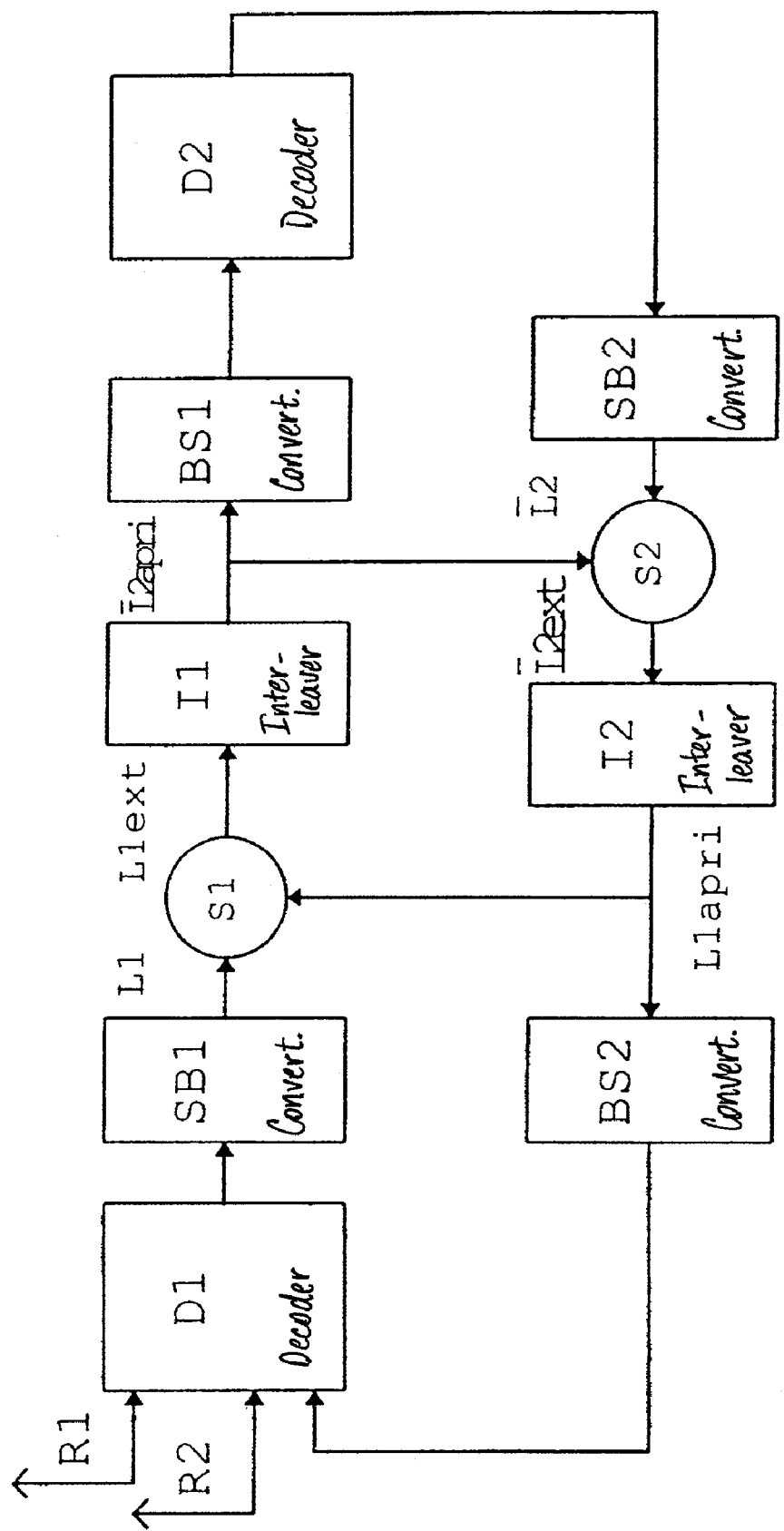
FIG. 6 shows a basic block diagram of a decoding apparatus for a serial concatenation scheme according to the alternative preferred embodiment of the present invention.

As an alternative preferred embodiment, the present invention may be applied in a coding/decoding operation according to a serial concatenation scheme as shown in FIGS. 5 and 6. In this case, no switching or puncturing is required at the output of the coding apparatus, as shown in FIG. 5, and the two encoders C1 and C2 are arranged in series, wherein the output signal of the first encoder C1 is supplied via the interleaver INT and the dividing unit DIV to the second encoder C2. As in the above parallel concatenation, the interleaver may be arranged to perform a bit-wise interleaving operation.

The dividing unit DIV is arranged to divide the scrambled or interleaved output signal of the first encoder C1 into (at least) two parallel signals which are space-time encoded by the second encoder C2 and directly supplied to (at least) two output channels (e.g. transmitting antennas A1 and A2). Thus, the first encoder C1 performs an outer encoding to generate an outer Convolutional code, and the second encoder C2 performs an inner space-time encoding to generate an inner space-time code such as the Recursive STTC (4, 8, or 16 state). Then, a space-time coded symbol consisting of the (at least) two space-time coded signals generated by the second encoder C2 is transmitted over the multi-channel communication system.

The decoding apparatus for the serial concatenation scheme is shown in FIG. 6. In particular, the same type of iterative decoding as in the parallel concatenation scheme may be performed. However, the demultiplexer DX is not required. First, the received space-time coded signals are supplied from the receiving antennas R1 and R2 to the first decoder D1 which performs a space-time decoding (e.g. MAP decoding) as in the above parallel concatenation scheme, i.e. decoding is performed based on at least two space-time coded signals and a first a-priori probability. The second decoder D2 then performs a convolutional decoding (e.g. MAP decoding) based only on the second a-priori information. Such a convolutional decoding is described e.g. in "A Soft-Input Soft-Output APP Module for Iterative Decoding of Concatenated Codes" by S. Benedetto et al, IEEE Communications Letters, Vol. 1, No. 1, January 1997.

Thus, the enhanced coding efficiency achieved by the present invention can be provided in serial concatenation schemes as well.

It is to be noted that the present invention is not restricted to the above preferred embodiments but can be used in any multi-channel communication system where space-time coding schemes can be used to maximize diversity gains. The space-time coded symbols may consist of at least two of any kind of complex signal values or symbols and are not restricted to the special case of QPSK signal values. Thus, the above description of the preferred embodiments and the accompanying drawings are only intended to illustrate the present invention. The preferred embodiments of the invention may vary within the scope of the attached claims.

In summary, the present invention relates to a method and apparatus for performing a space-time coding/decoding of an information signal to be transmitted via a multi-channel communication system. According to a parallel concatenation scheme, the output of two component space-time encoders may be alternately transmitted through respective transmission channels. Alternatively, according to a serial concatenation scheme, the output of a first component encoder is scrambled and divided into two parallel signals supplied to a second component space-time encoder. The poor coding gain of a single component code is multiplied by introducing scrambling of the input signal of one of the two component encoders so as to achieve a large equivalent number of states. To preserve full bandwidth efficiency of the component codes in the parallel concatenation scheme, the switching can be implemented as a puncturing at the output of the respective component encoders. The decoding is performed by component decoders connected via additional scrambling/descrambling operations, so as to achieve an iterative decoding operation. Thereby, a recursive space-time coding/decoding with high diversity gain can be achieved.

What is claimed is:

1. A method for performing a space-time decoding of at least two first space-time coded signals and at least two second space-time coded signals alternately transmitted via respective signals of a multi-channel communication system, comprising:

demultiplexing received signals into the at least two first space-time coded signals and the at least two second space-time coded signals;

obtaining a first decoding output signal by using a first decoder performing a first space-time decoding based on the at least two first space-time coded signals and a first a-priori probability signal;

applying an output of one of the first decoder, or a first conversion unit that converts the output of the first decoder, to a first subtracting unit where an a-priori information signal is subtracted;

scrambling an output of the first subtracting unit so as to generate a scrambled extrinsic information;

applying one of the scrambled extrinsic information, or an output of a second conversion unit converting the scrambled extrinsic information, as a second a-priori probability to a second decoder receiving the at least two second space-time encoded signals;

applying an output of one of the second decoder, or a third conversion unit converting the output of the second decoder, to a second subtracting unit which has another input receiving the scrambled extrinsic information;

generating a descrambled signal based on an output of the second subtracting unit; and applying the descrambled signal, or an output of a fourth conversion unit converting the descrambled signal, as the first a-priori probability signal to the first decoder.

2. A method according to claim 1, wherein said first and second space-time decodings are symbol-by-symbol space-time decoding operations, wherein said first and second decoding output signals are obtained by performing a symbol-to-bit reliability conversion of the decoding output, and wherein said first and second a-priori probabilities are determined by performing a bit-to-symbol reliability conversion based on said descrambled and scrambled signals.

3. A method according to claim 1, wherein said space-time decoding is performed by using a MAP algorithm.

4. A method according to claim 1, wherein a received signal is demultiplexed into a first sequence and a second sequence, prior to the first and second space-time decoding.

5. A method according to claim 4, wherein punctured signals of said at least two first space-time coded signals and at least two second space-time coded signals are replaced by erasures.

6. A method according to claim 5, wherein signal values for said erasures are set to zero.

7. A method according to claim 1, wherein said first and second space-time decodings are performed using an iterative decoding algorithm.

8. A method according to claim 1, wherein said at least two first and second space-time coded signals are recursive space-time trellis coded signals implemented in a Turbo coded modulation.

9. A method according to claim 1, wherein said at least two first and second space-time coded signals are coded according to a non-systematic coding scheme.

10. A method according to claim 1, wherein symbols of a respective one of the at least two first and second space-time coded signals comprise complex constellations.

11. A method according to claim 1, wherein said scrambling is a pseudo-random bit-wise interleaving.

12. A method according to claim 1, wherein said at least two first space-time coded signals are non-recursive Space-Time Trellis Coded signals, and said at least two second space-time coded signals are recursive Space-Time Trellis Coded signals.

13. A method according to claim 1, further comprising applying the output of the first decoder to the first conversion unit which converts the symbol reliability of the first decoder into a likelihood ratio or reliability.

14. An apparatus for performing a space-time decoding of at least two first space-time coded signals and at least two second space-time coded signals alternately transmitted via respective channels of a multi-channel communication system, comprising:

means for demultiplexing received signals into the at least two first space-time coded signal and the at least two second space-time coded signals first decoding means for obtaining a first decoding output signal by performing a first space-time decoding based on said at least two first space-time coded signals and a first a-priori probability signal;

first subtracting means for subtracting an a-priori information signal from an output of the first decoding means or from an output of a first converting means, said first converting means for converting the output of the first decoding means;

means for scrambling an output of the first subtracting unit to generate a scrambled extrinsic information;

second decoding means for receiving the scrambled extrinsic signal or an output of a second converting means, said second converting means for converting the scrambled extrinsic signal, and for performing a second space-time decoding based on said at least two second space-time coded signals, using the received scrambled extrinsic signal or output of the second converting means as a second a-priori probability;

second subtracting means for receiving an output of the second decoding means or an output of a third converting means, the third converting means to convert the output of the second decoding means, and for receiving the scrambled extrinsic information; and means for descrambling an output of the second subtracting means;

wherein an output of the means for descrambling, or an output of a fourth converting means for converting the descrambled signal, is applied to the first decoding means as said first a-priori probability signal.

15. An apparatus according to claim 14, wherein said first and second decoding means are arranged to perform a symbol-by-symbol space-time decoding operation, wherein first reliability conversion means are provided for performing a symbol-to-bit reliability conversion of the decoding outputs so as to generate said first and second decoding output signals, and wherein second reliability conversion means are provided for performing a bit-to-symbol reliability conversion of said descrambled and scrambled signals so as to generate said first and second a-priori probabilities, respectively.

16. An apparatus according to claim 14, wherein said first and second decoding means are arranged to perform decoding according to a MAP algorithm.

17. An apparatus according to claim 14, wherein said means for demultiplexing is arranged to replace punctured signals of said at least two first and second space-time coded signals by erasures.

18. An apparatus according to claim 17, wherein the signal values of said erasures are set to zero.

19. An apparatus according to claim 14, wherein said first and second decoding means are arranged to perform decoding using an iterative decoding algorithm.

20. An apparatus according to claim 14, wherein said at least two first and second space-time coded signals are recursive space-time trellis coded signals implemented in a Turbo coded modulation.

21. An apparatus according to claim 20, wherein said recursive space-time trellis coded signals are coded according to a four, eight or sixteen state code.

22. An apparatus according to claim 14, wherein said at least two first space-time coded signals are non-recursive Space-Time Trellis Coded signals, and said at least two second space-time coded signals are recursive Space-Time Trellis Coded signals.

23. An apparatus according to claim 14, wherein said multi-channel communication system is a multiple antenna wireless communication system.

24. A method for performing, a space-time decoding of at least two first space-time coded signals and at least two second space-time coded signals alternately transmitted via respective signals of a multi-channel communication system, comprising:

demultiplexing received signals into the at least two first space-time coded signals and the at least two second space-time coded signals;

obtaining a first decoding output signal by using a first decoder performing a first space-time decoding based on the at least two first space-time coded signals and a first a-priori probability signal;

applying an output of one of the first decoder, or a first conversion unit that converts the output of the first decoder, to a first subtracting unit where an a-priori information signal is subtracted;

scrambling an output of the first subtracting unit so as to generate a scrambled extrinsic information;

applying one of the scrambled extrinsic information, or an output of a second conversion unit converting the scrambled extrinsic information, as a second a-priori probability to a second decoder receiving the at least two second space-time encoded signals;

applying an output of one of the second decoder, or a third conversion unit converting the output of the second decoder, to a second subtracting unit which has an input receiving the scrambled extrinsic information;

generating a descrambled signal based on an output of the second subtracting unit; and applying the descrambled signal, or an output of a fourth conversion unit converting the descrambled signal, as the first a-priori probability signal to the first decoder, wherein applying the output of one of the first decoder or the first conversion unit comprises applying the output of the first conversion unit to the first subtracting unit;

applying one of the scrambled extrinsic information or an output of the second conversion unit comprises applying the output of the second conversion unit to the second decoder;

applying the output of one of the second decoder or the third conversion unit comprises applying the output of the third conversion unit to the second subtracting unit; and applying the descrambled signal or an output of the fourth conversion unit as the first a-priori probability signal comprises applying the output of the fourth conversion unit to the first decoder.

25. A method for performing a space-time decoding of at least two space-time coded signals transmitted via respective channels of a multi-channel communication system, comprising:

obtaining a first decoding output signal by using a first decoder performing a first space-time decoding based on the at least two space-time coded signals and a first a-priori probability signal;

applying an output of one of the first decoder or a first conversion unit converting the output of the first decoder to a first subtracting unit where an a-priori information signal is subtracted;

scrambling an output of the first subtracting unit to generate a scrambled extrinsic information;

applying the scrambled extrinsic information or an output of a second conversion unit converting the scrambled extrinsic information as a second a-priori probability to a second decoder;

applying an output of one of the second decoder and a third conversion unit converting the output of the second decoder to a second subtracting unit which has another input receiving the scrambled extrinsic information;

generating a descrambled signal based on the output of the second subtracting unit; and applying the descrambled signal or an output of a fourth conversion unit converting the descrambled signal as the first a-priori probability signal to the first decoder, applying the output of one of the first decoder or the first conversion unit comprises applying the output of the first conversion unit to the first subtracting unit;

applying the scrambled extrinsic information or the output of the second conversion unit comprises applying the output of the second conversion unit to the second decoder;

applying the output of one of the second decoder and the third conversion unit comprises applying the output of the second conversion unit to the second subtracting unit; and applying the descrambled signal or the output of the fourth conversion unit comprises applying the output of the fourth conversion unit to the first decoder.

26. An apparatus for performing a space-time decoding of at least two space-time coded signals transmitted via respective channels of a multi-channel communication system, comprising:
- a) first decoding means for performing a space-time decoding based on said at least two space-time coded signals and a first a-priori probability, and for outputting a first decoding output signal;
- b) second decoding means for performing decoding based on a second a-priori probability, and for outputting a second decoding output signal;
- c) subtracting means for subtracting a descrambled signal from said first decoding output signal to obtain a first extrinsic signal, and for subtracting a scrambled signal from said second decoding output signal to obtain a second extrinsic signal;
- d) scrambling means for generating said scrambled signal by scrambling said first extrinsic signal; and
- e) descrambling means for generating said descrambled signal by descrambling said second extrinsic signal;
- f) wherein said first and second a-priori probabilities are derived from the descrambled and scrambled signals, respectively, the apparatus further comprising:

first conversion means for converting the output of the first decoding means and applying the converted output of the first decoding means to the subtracting means to obtain the first extrinsic signal;

second conversion means for converting the scrambled first extrinsic signal and applying the converted scrambled first extrinsic signal as the second a-priori probability to the second decoding means, third conversion means for converting the output of the second decoding means and for applying the converted output of the second decoding means to the subtracting means to obtain the second extrinsic signal; and fourth conversion means for converting the descrambled signal and for applying the converted descrambled signal as the first a-priori probability signal to the first decoding means.

27. The apparatus according to claim 26, wherein said first and second decoding means are arranged to perform a symbol-by-symbol decoding operation, wherein first reliability conversion means are provided for performing a symbol-to-bit reliability conversion of the decoding outputs so as to generate said first and second decoding output signals, and wherein second reliability conversion means are provided for performing a bit-to-symbol reliability conversion of said descrambled and scrambled signals so as to generate said first and second a-priori probabilities, respectively.

28. The apparatus according to claim 26, wherein said at least two space-time coded signals are recursive space-time trellis coded signals implemented in a Turbo coded modulation.

29. The apparatus of claim 26, wherein:
- the first decoding means comprises a first decoder;
- the second decoding means comprises a second decoder;
- the subtracting means for subtracting the descrambled signal from the first decoding output signal to obtain the first extrinsic signal comprises a first subtracting unit;
- the subtracting means for subtracting the scrambled signal from the second decoding output signal to obtain the second extrinsic signal comprises a second subtracting unit;
- the scrambling means comprises an interleaver; and
- the descrambling means comprises a deinterleaver.

30. The apparatus of claim 26, wherein the first, second, third and fourth conversion means comprises respective first, second, third and fourth conversion units.

* * * * *

UNITED STATES PATENT AND TRADEMARK OFFICE
CERTIFICATE OF CORRECTION

| | |
|---|---|
| PATENT NO. | : 7,436,895 B1 |
| APPLICATION NO. | : 10/204946 |
| DATED | : October 14, 2008 |
| INVENTOR(S) | : Djordje Tujkovic |

Page 1 of 1

It is certified that error appears in the above-identified patent and that said Letters Patent is hereby corrected as shown below:

In the claims:

Claim 14, column 16, line 45, "second space-time coded signals first decoding means" should read

--second space-time coded signals;

first decoding means--

Signed and Sealed this

Sixth Day of January, 2009

JON W. DUDAS
*Director of the United States Patent and Trademark Office*